July 15, 1941.  W. S. L. TRINGHAM  2,249,443
HIGH FREQUENCY CONCENTRIC LINES
Original Filed April 28, 1937  2 Sheets-Sheet 1
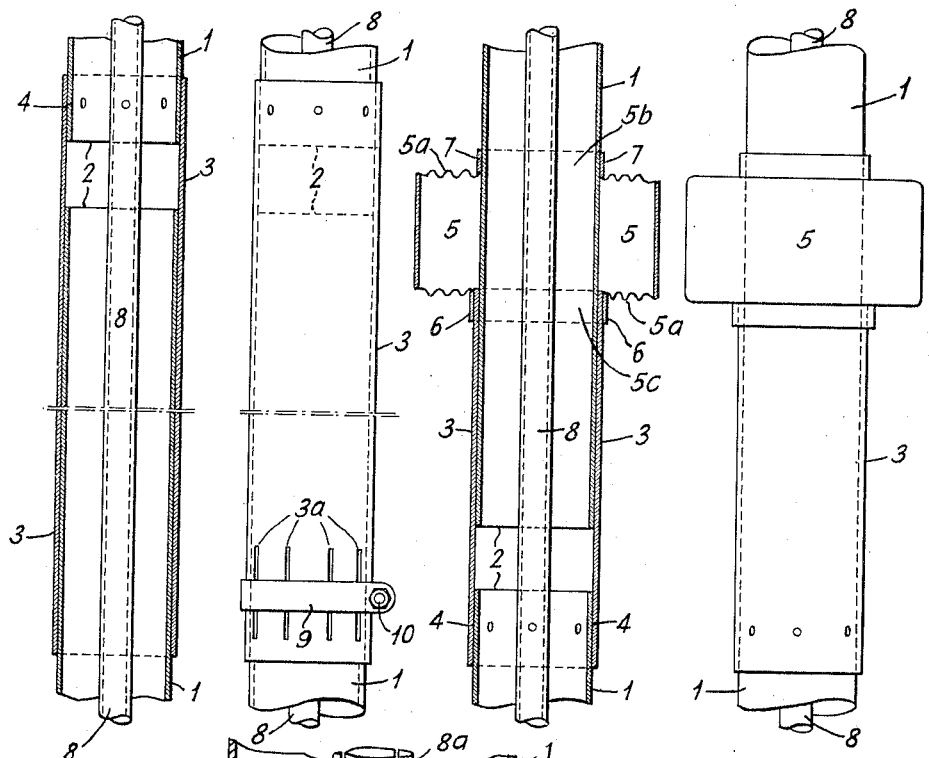
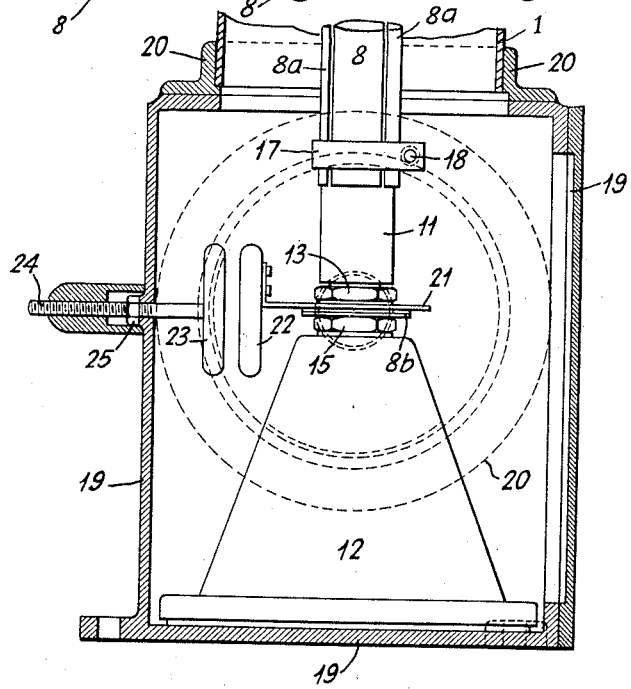
INVENTOR
WILLIAM S. L. TRINGHAM
BY
ATTORNEY

INVENTOR
WILLIAM S. L. TRINGHAM
ATTORNEY

Patented July 15, 1941

2,249,443

UNITED STATES PATENT OFFICE 2,249,443

HIGH FREQUENCY CONCENTRIC LINE

William Stuart Leader Tringham, Puttenham, Guildford Surrey, England, assignor to Radio Corporation of America, a corporation of Delaware Application April 28, 1937, Serial No. 139,350
Renewed December 6, 1939
In Great Britain April 29, 1936

4 Claims. (Cl. 178—44)

This invention relates to high frequency concentric feeders and more specifically to concentric feeders comprising outer and inner rigid tubular conductors and suitable for use for radio frequency energy of ultra-short wavelength.

The invention has for its object to provide an improved form of expansion joint for such feeders which shall be of simple construction and easily assembled and which shall have a minimum disturbing effect on the feeder characteristics.

Expansion joints for concentric feeders consisting of rigid outer and inner conductors are generally included, particularly where a substantial degree of expansion must be allowed for, in the run of the feeder. Such joints of course involve a change in diameter of the tubular conductors with consequent disturbances in the characteristics of the feeder. This change of diameter has a greater disturbing effect in the case of the smaller diameter inner conductor than in the case of the larger diameter outer conductors where the percentage change in diameter is less. In carrying out the present invention the expansion joint for the outer conductor may be located, as hitherto, in the run of the feeder but the expansion joint for the inner conductor is provided at the end of a run where the feeder enters a junction box. The expansion joint for the inner conductor in a preferred arrangement in accordance with this invention comprises an inner and outer tubular conductor, the former of which is a sliding fit within the latter, which is slit longitudinally over at least part of its length where it overlaps the inner conductor, clamping means being provided about the slit portion of said outer conductor and one of said conductors being anchored at its end remote from the sliding joint to a supporting insulator located within a junction box at the end of the feeder run.

The invention is illustrated in the accompanying drawings, in which:

Fig. 1 is a section of a concentric conductor showing the expansion joint of this invention as applied to an outer conductor;

Fig. 2 is an elevation of Fig. 1;

Fig. 3 is a section of a concentric conductor showing another embodiment of this invention;

Fig. 4 is an elevation of Fig. 3;

Fig. 7 is another section of Fig. 5, the section being taken on lines B—B.

Figure 6:
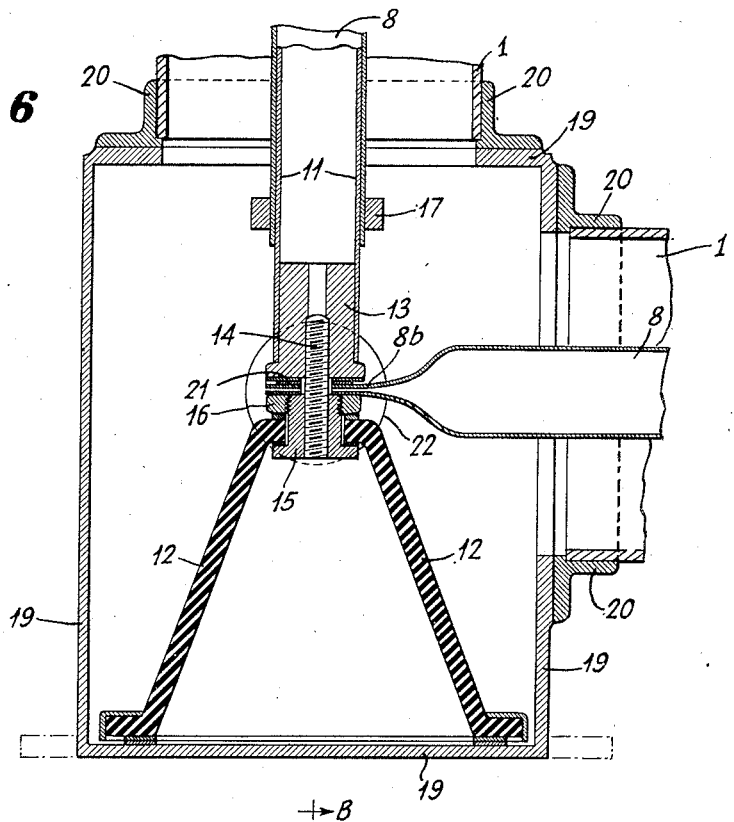
Fig. 6 is a section of Fig. 5, the section being taken on lines A—A.

Referring to Figs. 1 and 2 which show in section and elevation respectively a length of feeder having an expansion joint for the outer conductor provided in the run of the feeder—the purpose of these figures is to show the construction of the expansion joint in question—there is provided, in the run of the outer conductor 1 a gap 2 of the required length to allow for expansion and a metal sleeve 3 which is a sliding fit on the outer conductor 1 is located over this gap 2. This sleeve 3 is secured to the outer conductor at one side of the gap, for exemple, by soldering at 4 so as to make a good conductive connection thereto and the free end of the sleeve at the other side of the gap 2 is attached to the outer conductor 1 at that side of the gap through an expansion member or chamber 5 spun from thin sheet metal, such as brass. This expansion chamber is analogous in form to the type of expansion chamber employed in aneroid barometers and consists in a spun metal cylindrical box formed in one piece and the ends of which are provided with annular corrugations 5a. A central aperture 5b or 5c is provided in each corrugated end and the outer conductor 1 passes through these apertures so that the expansion chamber co-axially surrounds the outer conductor. The free end of the sleeve is soldered at 6 to the one corrugated end of the expansion chamber and the outer conductor is soldered at 7 to the other corrugated end of the expansion chamber. A water-tight expansion joint is thus provided in the outer conductor. The inner conductor, which passes right through the joint co-axially consists of a tube 8. The joint shown in Figs. 1 and 2, being water-tight, is well suited for use in the open.

Figs. 3 and 4 show in section and elevation, respectively, a somewhat simpler form of outer conductor expansion joint which is suitable for use inside a building. Here, as in Figs. 1 and 2, a gap 2 in the run of the outer conductor 1 is covered by a sleeve 3 but the aneroid type box 5 of Figs. 1 and 2 is dispensed with. Instead, the sleeve 3 is soldered to the conductor 1 at 4 on one side of the gap 2 and the end of the said sleeve on the other side of the gap is slotted and sprung, fitting over the conductor 1 as shown. The slots are clearly shown at 3a in Fig. 4. An adjustment clamp 9, which can be drawn as tight as desired by a nut and bolt at 10, is fitted round the slotted part of the sleeve 3.

Figure 5:
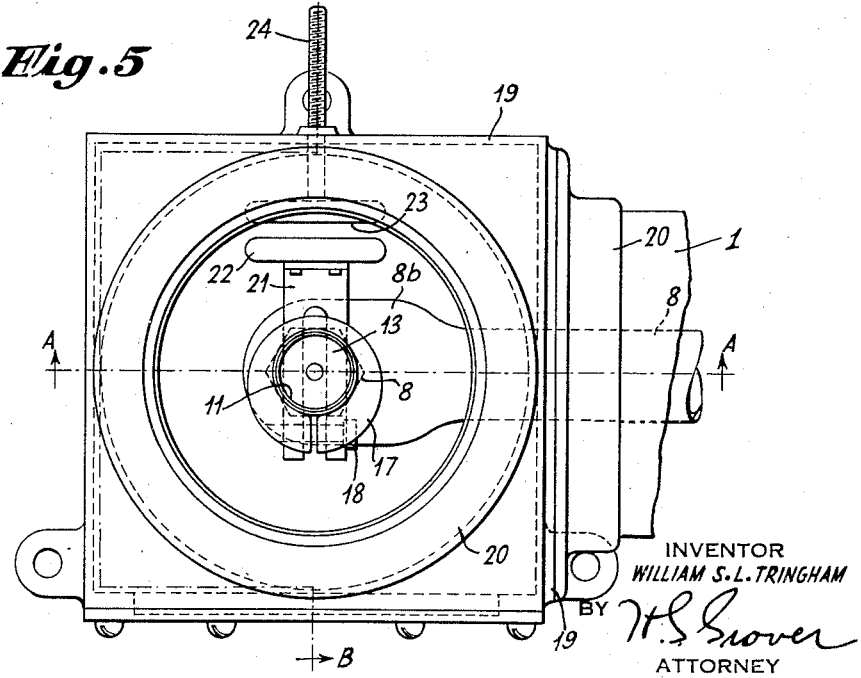
Fig. 5 is an expansion joint of this invention as applied to the inner conductor at a junction box.

Fig. 5 shows in plan, and Figs. 6 and 7 in section on the lines A—A, B—B, respectively, of Fig. 5, a preferred form of junction box incorporating an expansion joint for the inner conductor 8.

Referring to Figs. 5, 6 and 7, the expansion joint for the inner conductor 8 is formed by cutting short the said inner tubular conductor, say, two inches from the end of a run, and preferably three longitudinal saw cuts 8a, say, four inches, in length, are cut in the end in the tube. A short length 11 of tube which is a sliding fit in the inner conductor 8 extends into the latter for a distance which may conveniently be made about ten inches. The end of this length 11 of tube is secured to the locating insulator 12 normally provided in the junction box at the end of the run. As shown, the length 11 of tube is fitted with an internally bored and threaded plug or nut 13 which is engaged by one end of a stud 14, the other end of which is screwed into a threaded bore formed in a bush member 15 which is fixed to the insulator 12 with the aid of a nut 16. As shown, the end of the next run of inner conductor is flattened and spread as shown at 8b and provided with a hole to pass the stud 14 so that it can be firmly held and gripped, as shown best in Fig. 6. A clamping ring or clip 17 which may be made of phosphor bronze is located about the split end of the inner conductor 8 and this, when tightened by the screwed bolt 18 ensures a good contact between the inner conductor 8 and the tube 11 sliding therein.

The junction box shown in Figs. 5, 6 and 7 is an angle box giving a 90° change of direction. Of course, the joint shown is applicable to other forms of junction box, e. g. to a combined junction and switch box such as might be used in the feeder system of an ultra-short wave transmitter which it is desired to operate with two alternative aerial systems, for example, or such as might be used for connecting alternate transmitters with the same aerial system. In the illustrated case of Figs. 5, 6 and 7, there is a substantially cubical cast metal box having walls or faces 19 certain of which are apertured and provided as desired with flanges 20 adapted to receive the outer tubular conductors 1 of the concentric feeder runs to be connected. In the illustrated structure, the insulator 12, which is mounted on the bottom wall of the box, is of frusto-conical shape. Fixed to the insulator 12, by being fitted over the stud 14 and clamped as shown, is a laterally extending metal strip 21 in conductive connection with the inner conductors 8 and carrying at its end a circular metal disc 22 with rounded edges and which cooperates with a similar metal disc 23 carried by a screwed metal rod 24, extending through a side wall 19 of the junction box. The parts 22, 23, together constitute an adjustable condenser connected between the conductor 8 and earth and which can be varied (by screwing the rod 24 in or out) to compensate for any disturbing effect produced by the expansion joint in the feeder. 25 is a lock nut.

It is found that by providing the expansion joint for the inner conductor at the end of a feeder run in accordance with this invention, the consequent disturbing effects on the feeder characteristics are minimized and can readily be compensated for by suitable adjustment of the variable capacity 22—23 in the junction box at the appropriate end of the feeder run in question. The amount of expansion provided for by such an arrangement is found to be sufficient where the lengths of feeder run between junction boxes is not excessive and avoids the necessity of providing expansive joints for the inner conductor in the run of feeder where such joints set up a maximum disturbing effect.

What is claimed is:

1. A junction box for joining two high frequency transmission lines having inner and outer conductors concentrically arranged, said junction box being of conducting material and having at least two apertures therein for said lines, sliding expansion joints for at least one of said inner and outer conductors, the sliding expansion joint for said inner conductor causing a substantial disturbance in the ratio between the diameters of said conductors, the sliding expansion joint for said inner conductor being located within said junction box and near an aperture therein whereby said disturbance is minimized, and a condenser having a first and a second electrode located within said junction box, said first electrode being connected to said inner conductors, the second electrode of said condenser facing said first electrode and connected to said junction box for compensating the disturbing electrical effects caused by said junction box changing the characteristics of said lines.

2. In a high frequency system comprising at least two transmission lines having inner and outer conductors concentrically arranged, a junction box of conducting material having at least two apertures for said lines, sliding expansion joints for at least one of said outer and inner conductors, the sliding expansion joint for said inner conductor causing a substantial disturbance in the ratio between the diameters of said conductors, the sliding expansion joint for said inner conductor being located within said junction box and near an aperture therein whereby said disturbance is minimized, and a variable condenser having a first and a second electrode, said first electrode located within said junction box and connected to said inner conductor, the second electrode of said condenser facing said first electrode and adjustably supported thereto and connected to said junction box to vary the capacity between said inner and outer conductors for compensating the disturbing electrical effects caused by said junction box changing the characteristics of said lines.

3. A high frequency transmission line comprising an inner and an outer conductor concentrically arranged, said outer conductor having at least one section of enlarged cross-section along its length, a sliding expansion joint located in the run of said outer conductor, a sliding expansion joint for said inner conductor, said inner conductor joint having portions of dimensions differing substantially from the dimensions of said inner conductor and thereby causing a disturbance of the characteristics of said line, said inner conductor joint being located within said section of enlarged cross-section whereby said disturbance is minimized, and means within said section of enlarged cross-section for compensating for the remaining disturbance.

4. A high frequency transmission line comprising inner and outer conductors concentrically arranged, a junction box at an end of said line, a fixed support for the inner conductor of said line within said junction box, a sliding expansion joint located in the run of said outer conductor, a sliding expansion joint for said inner line, said inner conductor joint having portions of dimensions differing substantially from the dimensions of said inner conductor and thereby causing a disturbance of the characteristics of said line, said inner conductor joint being located within said junction box between the end of said inner conductor and said fixed support whereby said disturbances are minimized, and means for compensating for the remaining disturbance comprising an adjustable condenser connected between said inner conductor and said junction box.

WILLIAM STUART LEADER TRINGHAM.